US006736889B2

(12) United States Patent
Bengs et al.

(10) Patent No.: US 6,736,889 B2
(45) Date of Patent: May 18, 2004

(54) COMPOSITIONS COMPRISING STARCH AND/OR MODIFIED STARCH AND PLASTICIZERS

(75) Inventors: Holger Bengs, Frankfurt (DE); Jürgen Grande, Bad Soden (DE)

(73) Assignee: Celanese Ventures GmbH (DE)

( * ) Notice: Subject to any disclaimer, the term of this patent is extended or adjusted under 35 U.S.C. 154(b) by 0 days.

(21) Appl. No.: 10/402,062

(22) Filed: Mar. 28, 2003

(65) Prior Publication Data

US 2003/0194471 A1 Oct. 16, 2003

Related U.S. Application Data

(63) Continuation of application No. 09/462,548, filed as application No. PCT/EP98/03919 on Jun. 26, 1998, now Pat. No. 6,565,640.

(30) Foreign Application Priority Data

Jul. 9, 1997 (DE) .......................... 197 29 306

(51) Int. Cl.[7] ............................................. C09D 103/02
(52) U.S. Cl. .................. 106/215.2; 106/209.1
(58) Field of Search ............ 106/209.1, 215.2, 106/215.3

(56) References Cited

U.S. PATENT DOCUMENTS

| 2,831,853 A | 4/1958 | Satterly ............ 260/233.3 |
| 3,312,560 A | 4/1967 | Walton ................ 106/213 |
| 4,289,668 A | 9/1981 | Li ..................... 260/23 AR |
| 5,013,769 A | 5/1991 | Murray et al. ........... 523/111 |
| 5,224,989 A | 7/1993 | Likarova ............... 106/210 |
| 5,362,777 A | 11/1994 | Tomka ................... 524/47 |
| 5,397,834 A | 3/1995 | Jane et al. ............ 525/54.1 |
| 5,620,757 A | 4/1997 | Ninomiya et al. ...... 428/34.8 |

FOREIGN PATENT DOCUMENTS

| CH | 313774 | 6/1956 |
| DE | 2911475 | 9/1980 |
| DE | 3416406 | 11/1984 |
| DE | 3543633 | 6/1986 |
| EP | 0428965 | 5/1991 |
| EP | 0609983 | 8/1994 |
| EP | 0709030 | 5/1996 |
| WO | 90/05161 | 5/1990 |
| WO | 91/04278 | 4/1991 |
| WO | 92/19680 | 11/1992 |
| WO | 93/19125 | 9/1993 |
| WO | 95/04083 | 2/1995 |

OTHER PUBLICATIONS

CAPLUS AN 1993:100840, Ito et al., "Lubricant containing powder compositions in food manufacture", Nov. 1992 (copy of reference not included here; see parent application for c py).

CAPLUS AN 1982:543415, Kao Soap Co., "Quality Improvement of Cakes Produced From Unbleached Flour", Jun. 1982 (copy of reference not included here; see parent application for copy).

Primary Examiner—David Brunsman
(74) Attorney, Agent, or Firm—Connolly Bove Lodge & Hutz LLP

(57) ABSTRACT

Compositions are described, based on starch and/or on modified starch and comprising, as plasticizers, polyhydroxycarboxylic acids derived from aldoses and/or from ketoses, in particular from pentoses and hexoses, or comprising lactones of these acids. The materials can be processed thermoplastically to give shaped articles which are biodegradable and physiologically nonhazardous. They may be used as packaging or casing for food or drink or pharmaceutical products, or also for the controlled release of active substances, or else for producing temporary protective coatings.

25 Claims, No Drawings

COMPOSITIONS COMPRISING STARCH AND/OR MODIFIED STARCH AND PLASTICIZERS

RELATED APPLICATIONS

This application is a continuation of Ser. No. 09/462,548 filed Mar. 20, 2000 which is now U.S. Pat. No. 6,565,640 which in turn is a Rule 371 application of PCT/EP98/03919 filed Jun. 26, 1998 and claims benefit to German application number 197 29 306.9 filed Jul. 9, 1997.

The invention relates to compositions which comprise starch and/or modified starch and plasticizers and also, if desired, other additives, and which can be processed to give shaped articles, in particular to give shaped biodegradable articles, and to the use of the compositions for producing shaped articles.

Constantly increasing awareness of the environment, together with continuing increases in the strictness of regulations relating to waste disposal or recycling, have led to a marked increase in efforts to use biodegradable materials for producing shaped articles. In addition to this, ever increasing efforts are being made to use, wherever possible, materials based on renewable raw materials rather than those based on mineral oil. In many cases substances from natural sources are also less physiologically hazardous.

Starch and modified starch, alone or else mixed with other polymers, in particular with biopolymers, are renewable raw materials of constantly increasing importance, especially for producing shaped articles, such as foils or films. There are many problems here for processors. For successful shaping of starch, modified starch or else mixtures with other polymers, very intimate mixing, i.e. homogenization, of the components is required, in particular if the materials are to be processed thermoplastically. It is also important that during shaping the mixture has been sufficiently plasticized, in order to avoid having to accept excessively high shaping temperatures and the associated decomposition of the components. The shaped articles, furthermore, should not only have good biodegradability but also have a very homogeneous internal structure and good mechanical properties, such as strength and elasticity. In particular, a requirement for most applications is that brittleness and abrasion are very low. The plasticizer should also be environmentally friendly, i.e. biodegradable and physiologically nonhazardous.

There is a wide variety of known molding compositions which are based on starch, comprise plasticizer and can be processed to give shaped articles. U.S. Pat. No. 3,312,560, for example, describes how amylose, with diglycerol as plasticizer, can be used to produce foils from aqueous solutions, via coagulation. In the presence of a certain amount of water the diglycerol-plasticized amylose can also be processed by extrusion to give foils. However, the method is restricted to the processing of amylose or of mixtures of amylose with low contents of amylopectin and, respectively, of chemically modified amylose. A further disadvantage is that diglycerol first has to be synthesized.

EP-A2-0 609 983 describes starch having at least two sugar alcohols of mono- or disaccharides as a plasticizer, and also describes water-containing compositions from which biodegradable articles can be produced, also with concomitant use of emulsifiers. Prior-art plasticizers mentioned in this text for starch products include low-molecular-weight propylene glycol, sorbitol, mannitol and polyvinyl alcohol. The compositions may initially be processed to give pelletized material, using an extruder, and this may subsequently be further processed to give shaped articles, e.g. by injection molding. A disadvantage of the process described there is the use of the emulsifier, which shows a tendency to migrate to the surface, as well as known chemical effects such as low thermal stability. The process is relatively complicated and attended by additional costs. In addition, the blending of at least two sugar alcohols with the amount of water stated there makes the shaped articles susceptible to fracture.

Thermoplastic mixtures of starch with other polymers, such as proteins, have been described, for example, in WO-A1-93/19125. Crosslinking, e.g. by aldehydes, is first required here. The plasticizers recommended comprise especially polyhydroxy compounds and various esters. Due to the crosslinking step the products obtained have only a very narrow processing range. The reaction is very sensitive and susceptible to problems, and processability is therefore reduced.

WO 90/05161 describes what are known as fatty-acid-based lubricants (fats, lecithins, fatty acids). These compounds, which also have free carboxyl groups, facilitate the processing procedure, but have the disadvantage of being unable on their own to plastify starch sufficiently.

U.S. Pat. No. 5,397,834 describes biodegradable thermoplastic compositions built up on the basis of proteins and aldehyde starch, where aldehyde starch and proteins have been crosslinked with one another. The compositions may comprise antioxidants, inter alia from 0.001 to 1% of ascorbic acid, preferably in the form of ascorbylpalmitate, as well as plasticizers, lubricants and extenders.

Although there is a wide variety of known compositions which comprise starch or, respectively, modified starch and plasticizers, and of known processes for producing shaped articles from compositions of this type, there is a need for compositions of this type which offer advantages over products of the prior art.

It is therefore an object of the invention to provide compositions which comprise starch and/or modified starch and plasticizers, can be prepared simply and cost-effectively, have good homogeneity, and even in a mixture with other polymers, in particular with biopolymers, such as proteins, are very homogeneous, and have good thermoplastic processability, are physiologically nonhazardous and biodegradable, and can advantageously be processed to give shaped articles which are useful in industry, and have good homogeneity and good mechanical properties, such as excellent flexibility, and in which the plasticizer has little or no tendency to migrate.

This object is achieved by compositions comprising starch and/or modified starch and plasticizers for producing shaped articles, in particular shaped biodegradable articles, wherein the compositions comprise at least one polymer based on starch and/or on modified starch and, as plasticizers, polyhydroxycarboxylic acids derived from aldoses and/or from ketoses or comprise lactones of these acids except ascorbic acid in amounts of up to 1% by weight, based on the solids in the compositions, and also, if desired, comprise other polymers, in particular biopolymers and additives, such as extenders, lubricants, mold-release agents, dyes, water and the like.

Other advantageous embodiments of the novel compositions are wherein the plasticizer is a polyhydroxycarboxylic acid derived from pentose and hexose, or a lactone of said polyhydroxycarboxylic acid derived from pentose and hexose. The plasticizer can also be a sugar acid or lactone of said sugar acid; an aldonic acid or a lactone of said aldonic acid; an uronic acid or a lactone of said uronic acid or a gluconic acid or gluconolactone or a mixture thereof. The plasticizer is preferably present in an amount from 2 to 30% by weight. The composition can contain destructured starch, hydrolytically degraded starch, chemically modified starch, cationically or anionically modified starch. The composition further comprises proteins as other polymers. The composition preferably has a pH set at from 6 to 10, preferably 8 to 10. The composition can further comprise an additional plasticizer. The composition can comprise a total of from 3 to 50% by weight of the plasticizer. The composition according to the invention can be used as a shaped article. The composition according to the invention can be used for the production of the following:

- a packaging for food or drink,
- a sausage casing,
- a packaging for pharmaceutical products,
- a shaped articles for the controlled release of active substances and
- a temporary protective coating for a technical device. The invention further relates to a process for preparing a composition which comprises mixing and homogenizing starch and/or modified starch and plasticizers and optionally other polymers and additives, wherein said plasticizers are polyhydroxycarboxylic acids derived from aldoses and/or from ketoses, or using lactones of these acids. The process preferably has the pH of the composition set at from 8 to 13 by adding a base.

A group of starches which can be used within the scope of the invention comprises the starches obtained from vegetable raw materials. These include starches made from tubers, such as potatoes, cassaya, maranta or sweet potato, from seeds, such as wheat, corn, rye, rice, barley, millet, oats or sorghum, from fruits, such as chestnuts, acorns, beans, peas and other pulses, or bananas, or from plant pith, for example of the sago palm.

The starches which can be used for the purposes of the invention are composed substantially of amylose and amylopectin, in varying proportional quantities.

Particularly good results are achieved with, inter alia, starches made from potatoes (e.g. ®Toffena from Südstärke) or corn (e.g. Maize Starch from National Starch), or else from polyglucans, which feature a perfectly linear structure of the polymers.

The molecular weights of the starches which can be used according to the invention may vary over a wide range. The starches which can be used as a basis for the novel thermoplastic mixture are those which are composed substantially of a mixture of amylose and amylopectin, with molecular weights $M_w$ within the range from $5 \times 10^4$ to $1 \times 10^7$. Preference is given to relatively long-chain polymers with molecular weights $M_w$ of from $1 \times 10^6$ to $5 \times 10^6$.

Preference is also given to linear starches, preferably polyglucans, in particular 1,4-α-D-polyglucan, with molecular weights $M_w$ within the range from $5 \times 10^2$ to $1 \times 10^5$, preferably with molecular weights $M_w$ of from $1 \times 10^3$ to $5 \times 10^4$.

Besides molding compositions based on starches of native vegetable origin, the invention also includes thermoplastic mixtures or molding compositions with starches which have been chemically modified, have been obtained by fermentation, are of recombinant origin or have been prepared by biotransformation (biocatalysis). The term "biocatalysis" is used synonymously with the term "biotransformation".

For the purposes of the present invention, "chemically modified starches" are starches whose properties have been altered from their natural properties by chemical means. This is achieved substantially by polymer-analogous reactions in which starch is treated with mono-, bi- or polyfunctional reagents and/or oxidants. The hydroxyl groups of the polyglucans of the starch are preferably transformed here by etherification, esterification or selective oxidation, or the modification is based on a free-radical-initiated graft copolymerization of copolymerizable unsaturated monomers onto the starch backbone.

Particular chemically modified starches include starch esters, such as xanthogenates, acetates, phosphates, sulfates and nitrates, starch ethers, e.g. nonionic, anionic or cationic starch ethers, oxidized starches, such as dialdehyde starch, carboxy starch, persulfate-degraded starches and similar substances.

For the purposes of the present invention, "fermentative starches" are starches obtained by fermentative processes using naturally occurring organisms, such as fungi, algae or bacteria, or which can be obtained by implementing, and with assistance from, fermentative processes. Examples of starches from fermentative processes are gum arabic and related polysaccharides (gellan gum, ghatti gum, karaya gum, gum tragacanth), xanthan, emulsan, rhamsam, wellan, schizophyllan, polygalacturonates, laminarin, amylose, amylopectin and pectins.

For the purposes of the present invention, "starches of recombinant origin" or "recombinant starches" are specifically starches which can be obtained by fermentative processes, or with the involvement or assistance of fermentative processes, using organisms which do not occur in nature, but with the aid of natural organisms modified by genetic engineering, for example fungi, algae or bacteria. Examples of starches from fermentative processes using genetically engineered modifications are amylose, amylopectin and polyglucans.

For the purposes of the present invention, "starches prepared by biotransformation" are starches, amylose, amylopectin or polyglucans prepared by a catalytic reaction of monomeric fundamental building blocks, generally of oligomeric saccharides, in particular of mono- or disaccharides, by using a biocatalyst (or: enzyme) under specific conditions. Examples of starches from biocatalytic processes are polyglucan and modified polyglucans, polyfructan and modified polyfructans.

Finally, advantageous thermoplastic mixtures may also be obtained using derivatives of the individual starches mentioned. For the purposes of the present invention, "derivatives of starches" and "starch derivatives" very generally are modified starches, i.e. starches whose properties have been altered by changing the natural amylose/amylopectin ratio or carrying out a pregelatinization, a partial hydrolytic degradation or a chemical derivatization.

Examples of particular derivatives of starches are oxidized starches, e.g. dialdehyde starches or other oxidation products with carboxyl functions, or native ionic starches (e.g. with phosphate groups) or starches which have been further modified ionically, where this term covers both anionic and cationic modifications.

The destructured starches which can be used for the purposes of the invention include those which have been homogenized using, for example, glycerol, so that crystalline reflections are no longer visible in X-ray diffraction and starch grains or birefringent regions are no longer visible under a polarizing microscope at a magnification of one thousand. In this connection reference is made to DE A1-3931363, the disclosure of which is expressly incorporated herein by way of reference.

Most of the plasticizers used according to the invention are commercially available products, e.g. gluconic acid, galacturonic acid, glucaric acid or glucuronic acid. They may also be obtained from the carbohydrate sugars by appropriate oxidation. In this connection reference is made to Lehrbuch der Organischen Chemie [Organic Chemistry Textbook] by Beyer, Walter, S. Hitzel Verlag, Stuttgart, 1991, 22nd edition, pages 431–432, paragraph 2. This disclosure is expressly incorporated herein by way of reference.

The other polymers which may be used concomitantly include especially proteins, such as vegetable proteins, e.g. sunflower protein, cottonseed protein and the like, and also plasma protein, egg white and the like.

It was particularly surprising that according to the invention it is possible to obtain compositions which are particularly homogeneous and have excellent processability to give shaped articles, in particular by thermoplastic methods such as shaping, injection molding, etc. It is therefore possible to obtain foils, casings, packaging, containers, etc. which may be in immediate contact with food, drink or pharmaceutical products.

The plasticizer is physiologically nonhazardous and does not tend to migrate, and is even difficult to leach out from the shaped article using liquids, for example, which may emerge from food or drink. Gluconic acid or, respectively, the corresponding lactone, and other compounds of the class of substances described here as plasticizers, have preserving properties, and appropriate shaped articles are therefore particularly advantageous in applications in the food and drink sector and the pharmaceutical sector.

The shaped articles are not brittle and also show no abrasion, and are transparent. The plasticizers used according to the invention in the composition enter into particularly advantageous interaction canot observed with known plasticizers, such as sorbitol, glycerol, etc. In particular, it has been found that it is advantageous to operate at a pH above 7, particularly preferably in the range from 8 to 10. However, the plasticizers of the present invention may be used advantageously even at higher pH values, up to a pH of 13. If the pH diverges greatly from the neutral value 7, the amount of the plasticizer should be increased. In particular when processing in the acid pH range, the amounts of plasticizer required may on occasions be substantially higher than when working in the alkaline range.

The novel thermoplastic molding composition can be processed to give products using known processing methods. For example, in a first step it may be pelletized.

The invention therefore also provides a pelletized material obtainable by extruding and pelletizing the thermoplastic mixture according to the invention.

In addition, moldings or films with good biodegradability and improved mechanical properties can be obtained, either directly or by further thermoplastic processing of pelletized material with thermoplastic properties.

Finally, the invention also includes the use of the thermoplastic mixtures for producing moldings or films. Altogether, the novel products therefore cover a wide variety of possible applications. These include specifically adhesives for paper and corrugated board, shaped articles produced by injection molding, especially rods, tubes, bottles, capsules, pellets, additives for food or drink, foils, in the form of coatings or free-standing foils, or also in the form of laminates, especially films, packaging materials, bags, and release-slowing materials for controlled release of active substances in general, in particular drugs, pesticides or other active substances used in agriculture, fertilizers, flavorings, etc. The release of the active substance here may take place from foils, films, tablets, particles, microparticles, rods or other extrudates or other shaped articles.

More preferred applications include packaging for food or drink, in particular casings or wrappings for sausages or cheese absorbers, powders and the like.

In a particular embodiment the novel thermoplastic mixtures are used to produce shaped articles for the controlled release of active substances, for example tablets or dragees.

Another expedient and particularly advantageous use of the novel thermoplastic mixture relates to the production of shaped articles which are suitable for producing solid shaped articles, hollow articles or combinations of these.

Another excellent use of the novel thermoplastic mixture is for producing films for use in agriculture.

Another particular variant of the invention is the use of the thermoplastic mixture for producing films for use in food or drink applications.

Another specific use of the thermoplastic mixture is for producing films to be as packaging surrounding food or drink.

One more highly advantageous use of the novel thermoplastic mixture is in producing films for use as packaging for food or drink with full surface contact with the food or drink.

A final particularly advantageous use of the novel thermoplastic mixture is in producing flat or tubular films for use as food wrappings or casings for sausages or cheese.

For the purposes of the present invention, preference is also given to the use of the thermoplastic mixture as a short-lived protective film for technical consumer articles.

The invention is described in more detail at the examples below.

EXAMPLES

Example 1

Preparation of a Thermoplastic Molding Composition Made From Potato Starch and Gluconolactone at Basic pH The materials are prepared in a kneading assembly (IKA Duplex kneader). The kneading assembly is heated to 140° C. 150 g of potato starch (Toffena from Südstärke) are added while the kneading assembly is in its operating condition. 22.5 g of δ-gluconolactone (15% by weight) are dissolved in about 70 g of deionized water (pH=7) (pH=from 3 to 4) and the pH value is set to 8 by adding 1 mol of NaOH solution. The total amount of water is set to 75 g by adding more deionized water. The pH is checked using a WTW (pH 538) pH meter (calibration against phosphate buffer). The solution is slowly transferred in a fine stream into the starch in the kneader. This is followed by kneading until the material becomes glassy (for about 20 to 30 minutes). Thermoplastification takes place with the cover closed, but it may be removed for short periods for observation. The kneader is stopped, the feed equipment is removed and the molding composition is removed while still hot. The molding composition is glassy, viscous and flexible. After cooling, the thermoplastic material can be further processed. The molding composition becomes increasingly hard as it cools, but retains a certain flexibility.

Examples 2a and b

Preparation of Other Thermoplastic Molding Compositions From Potato Starch and Gluconolactone at Basic pH The experiments are carried out as described in Example 1, but with varying contents of δ-luconolactone. δ-Gluconolactone: (5 and 30%).

Example 3

Comparative Example
Preparation of a Thermoplastic Molding Composition From Potato Starch and Glucose at Basic pH The materials are prepared in a kneading assembly (IKA Duplex kneader). The kneading assembly is heated to 140° C. 150 g of potato starch (Toffena from Südstärke) are added while the kneading assembly is in its operating condition. 22.5 g of glucose (15% by weight) are dissolved in about 70 g of deionized water (pH=7) and the pH value of the solution is set to 8 by adding 1 mol of NaOH solution. The total amount of water is set to 75 g by adding more deionized water. The pH is checked using a WTW (pH 538) pH meter (calibration against phosphate buffer). The solution is slowly transferred in a fine stream into the starch in the kneader. This is followed by kneading until the material becomes glassy (for about 20 to 30 minutes). Thermoplastification takes place with the cover closed, but it may be removed for short periods for observation. The kneader is stopped, the feed equipment is removed and the molding composition is removed while still hot. The molding composition is glassy, viscous and discolored brown. After cooling, the thermoplastic material can be further processed. The molding composition becomes increasingly hard as it cools.

Example 4
Preparation of a Film From Thermoplastic Molding Compositions Comprising Starch and δ-Gluconolactone (e.g. Examples 1 and 2), Using a Compression-molding Method A compression-molding method is used to process the thermoplastic molding composition to give a film. A commercially available Schwabenthan (Polystat 300 S) press is used. The press is preheated to 130° C. The preparation of the specimens uses a "sandwich technique" between two fabric-reinforced Teflon sheets held apart by a metal frame of about 100 μm thickness. As preparation, about 2 g of the composition prepared in the kneader are placed in the middle of the lower sheet. The specimen is held for 5 minutes at a temperature of 100° C. and a pressure of 1 t. The specimen is then compression molded at 100° C. for 5 minutes at a pressure of 10 t. This corresponds to a pressure of 200 bar. The pressure is released and the specimen is transferred to another press for cooling. This is a water-cooled press from Robert Fuchs Hydraulische Maschinen und Werkzeuge. A pressure of 50 bar is applied during the cooling procedure for a period of 2 minutes.

The properties of the products described above are given in Table I.

TABLE I

Thermoplastic molding compositions with gluconolactone or glucose and assessment of the foils manufactured from these at 130° C.

| Starch | Plasticizer (%) | pH | Temperature of kneader (° C.) | Condition of molding composition | Temperature of press (° C.) | Condition of film |
|---|---|---|---|---|---|---|
| Potato starch | δ-Glucono-lactone, 5 | 8 | 140 | Homogeneous, viscous, flexible; after 24 h at room temperature: flexible (Example 2a) | 130 | Transparent, homogeneous, clear, flexible |
| Potato starch | δ-Glucono-lactone 15 | 8 | 140 | Homogeneous, viscous, flexible; after 24 h at room temperature: flexible (Example 1) | 130 | Transparent, homogeneous, clear, very flexible |
| Potato starch | δ-Glucono-lactone 30 | 8 | 140 | Homogeneous, viscous, flexible; after 24 h at room temperature: flexible (Example 2b) | 130 | Opaque, structured, flexible |
| Potato starch | Glucose 15 | 8 | 140 | Homogeneous, viscous, flexible; after 24 h at room temperature; hard, brittle (Example 3, Comparative Example) | 130 | Lustrous, hazy, brown colored, very rigid, very easily fractured |

Example 5
Preparation of a Thermoplastic Molding Composition Made From Potato Starch and Gluconolactone and From Another Plasticizer at Basic pH The compounds are prepared in a kneading assembly (Brabender kneader). The kneading assembly is heated to 140° C. 30 g of potato starch (Toffena from Südstärke) are added while the kneading assembly is in its operating condition. 1.5 g of δ-gluconolactone are dissolved in 10 g of deionized water (pH=7) (ph=from 3 to 4) and the pH value is set to 8 by adding 1 mol of NaOH solution. The total amount of water is set to 15 g by adding more deionized water. The pH is checked using a WTW (pH 538) pH meter (calibration against phosphate buffer). 3 g of glycerol are added to the solution. The solution is slowly transferred in a fine stream into the starch in the kneader. This is followed by kneading until the material becomes glassy (for about 20 to 30 minutes). Thermoplastification takes place with the cover closed, but it may be removed for short periods for observation. The kneader is stopped, the feed equipment is removed and the molding composition is removed while still hot. The molding composition is glassy, viscous and flexible. After cooling, the thermoplastic material can be further processed. The molding composition is glassy and viscous. The molding composition becomes increasingly hard as it cools. However, it retains a certain flexibility.

Example 6
Preparation of a Thermoplastic Molding Composition Made From Potato Starch and Gluconolactone and From Another Plasticizer at Acid pH The compounds are prepared in a kneading assembly (Brabender kneader). The kneading assembly is heated to 140° C. 30 g of potato starch (Toffena from Südstärke) are added while the kneading assembly is in its operating condition. 1.5 g of δ-gluconolactone are dissolved in 10 g of deionized water (pH=7) (ph=from 3 to 4) and the pH value of the solution is set to 2 by adding 1 mol of HCl solution. This requires from about 2 to 3 ml of the hydrochloric acid solution. The total amount of water is set to 15 g by adding more deionized water. The pH is checked using a WTW (pH 538) pH meter (calibration against phosphate buffer). 3 g of glycerol are added to the solution. The solution is slowly transferred in a fine stream into the starch in the kneader. This is followed by kneading until the material becomes glassy (for about 20 to 30 minutes). Thermoplastification takes place with the cover closed, but it may be removed for short periods for observation. The kneader is stopped, the feed equipment is removed and the molding composition is removed while still hot. The molding composition is glassy, viscous and flexible. The molding composition becomes increasingly hard as it cools. After cooling, the thermoplastic material can be further processed.

Example 7
Preparation of Other Thermoplastic Molding Compositions Made From Potato Starch and Gluconolactone With Another Plasticizer at Various pHs The experiments are carried out as described in Examples 5 and 6 with varying pHs (pHs: 2, 4, 6, 8, 10 and 12).

Example 8
Preparation of Two Thermoplastic Molding Compositions Made From Potato Starch and Gluconolactone With Another Plasticizer, at pH 7

The experiments were in principle carried out as described in Examples 5 and 6. The difference was that in one case the pH was set directly to pH 7 by adding 1 molar NaOH solution. To ensure comparability with the higher salt loading in the experiments in conditions diverging markedly from a neutral pH, a second experiment was carried out as follows. The pH is first set to pH 12 using 1 molar NaOH solution. It is then lowered again to pH 7 using a 1 molar HCl solution. No differences are observed in the preparation of the mixtures.

The films made from the molding compositions were produced by processing the thermoplastic molding compositions of Examples 5 to 8 as described in the description of the experiment in Example 4. The temperature during preparation of the thermoplastic molding compositions was in all cases 140° C. The temperature during press-molding was 130° C.

Table II
Assessment of thermoplastic molding compositions made from potato starch and gluconolactone with another plasticizer, and assessment of the foils manufactured therefrom at 130° C.

TABLE II

| Starch | Water (%) | Glycerol | δ-Gluco-nolactone | pH | Condition of the molding composition | Condition of the films |
| --- | --- | --- | --- | --- | --- | --- |
| Potato starch | 50 | 10 | 5 | 2 | Glassy, viscous, homogeneous, colorless; after 24 h at room temperature: hard | Easily fractured, brittle, transparent, slightly inhomogeneous, colorless |
| Potato starch | 50 | 10 | 5 | 4 | Glassy, viscous, homogeneous, colorless; after 24 h at room temperature: hard | Flexible, transparent, slightly inhomogeneous, colorless |
| Potato starch | 50 | 10 | 5 | 6 | Glassy, viscous, homogeneous, colorless; after 24 h at room temperature: flexible | Flexible, transparent, homogeneous, colorless |
| Potato starch | 50 set directly | 10 | 5 | 7 | Glassy, viscous, homogeneous, colorless; after 24 h at room temperature: flexible | Very flexible, transparent, homogeneous, colorless |
| Potato starch | 50 via pH 12 to pH 7 | 10 | 5 | 7 | Glassy, viscous, homogeneous, colorless; after 24 h at room temperature: flexible | Very flexible, transparent, homogeneous, colorless |

TABLE II-continued

| Starch | Water (%) | Glycerol | δ-Gluco-nolactone | pH | Condition of the molding composition | Condition of the films |
|---|---|---|---|---|---|---|
| Potato starch | 50 | 10 | 5 | 8 | Glassy, viscous, homogeneous, colorless; after 24 h at room temperature: flexible | Flexible, transparent, homogeneous, colorless |
| Potato starch | 50 | 10 | 5 | 10 | Glassy, viscous, homogeneous, colorless; after 24 h at room temperature: flexible | Flexible, opaque, slightly inhomogeneous, colorless |
| Potato starch | 50 | 10 | 5 | 12 | Glassy, viscous, homogeneous, brown colored; after 24 h at room temperature: flexible | Easily fractured, brittle, not transparent, inhomogeneous, brown colored |

Example 9
Preparation of a Mixture Made From a Thermoplastic Mixture Comprising Starch, 1,4-α-D-polyglucan and Gluconolactone for Further Processing Using a Twin-screw Extruder 2 g of potato starch (potato flour, e.g. Toffena™ from Südstärke) and 0.5 kg of 1,4-α-D-polyglucan (amylose) are mixed with one another and manually homogenized. (A mixer (a standard kitchen device, for example, is adequate for the amounts described) may be used if the particle sizes of the polymers used differ markedly from one another.) 300 g of δ-gluconolactone are then slowly added. During this the mixture is kneaded by hand, taking into account safety regulations (disposable laboratory gloves). Once addition has ended and the kneading procedure has begun, the material is highly tacky and relatively large agglomerates form. As the homogenization proceeds, the material becomes increasingly dry and powdery. This is attributable to absorption of the polar additives by the starch and amylose. The mixture prepared in this way can be used directly for further processing in an extruder.

Example 10
Production of Extruded Films From a Thermoplastic Mixture Comprising Starch, 1,4-α-D-polyglucan and Gluconolactone, Using a Twin-screw Extruder This experiment is carried out in a twin-screw extruder (Haake Rheomex PTW 25/28p), using the polymer mixture prepared in Example 9. The screws used are of the standard conical design. The extruder has four variably controllable heating elements. The processing temperature in all of the zones is 140° C. The temperature curves are indicated on-line using commercially available software. The temperature of the material at the die is on average ten degrees Celsius above the temperature of the heating elements. The rotation rate is 25 rpm. The extrudate discharges through a slot die of dimensions 100 mm in width and 0.2 mm in height (height adjustable from 0.2 to 1.0 mm).

The extruder is run with a marked overfeed, i.e. sufficient material is made available at the feed throat. In addition, a ram is used to ensure continuous feed. Care has to be taken that the material is conveyed very uniformly. The ram is composed of high-performance plastic (or, if desired, wood) in order to avoid abrasion of metal from tooling of this type. The extrudate discharged from the die after a starting time of about 10 minutes is initially milky and opaque. The extruded foil is very flexible to begin with. The air rapidly-hardens the foil. This is conveyed onward by way of downstream conveyor belt. The extruded foil is extensible when hot, but this property decreases noticeably as it cools.

The specimens obtained in this way may, without further treatment (cleaning or finishing) be subjected to further analysis, e.g. determination of water-resistance and mechanical properties.

Example 11
Preparation of a Thermoplastic Molding Composition Made From Potato Starch, Ascorbic Acid and Other Additives The compounds are prepared in a kneading assembly (Brabender kneader). The kneading assembly is heated to 140° C. 30 g of potato starch (e.g. Toffena from Südstärke) are added to the kneading assembly in its operating condition. 15 g of deionized water are added. After a homogenizing phase of about 10 minutes, firstly 5.1 g of ascorbic acid and then 1 g of glyoxal (40% strength aqueous solution) are added. The mixture is homogenized and, after a further 10 minutes in the kneader, removed while the apparatus is still in its heated condition. The molding composition is glassy and viscous. With the passage of time (after about 24 h at room temperature) the material becomes increasingly hard. The thermoplastic material may be further processed after cooling.

Example 12
Preparation of Films at 100° C. From Thermoplastic Molding Compositions with Gluconolactone or Glucose The molding compositions for producing the films in this example (Table III) were prepared in a manner similar to that of Examples 1 to 3. The properties of the films are compared. The films are obtained by operating as in Example 4 at a temperature of 100° C. (Comparative Examples at 130° C. are given in Example 4.)

TABLE III

Assessment of films made from thermoplastic molding compositions with gluconolactone or glucose by processing at 100° C.

| Starch | Plasticizer (%) | pH* | Temperature kneader (° C.) | Temperature press (° C.) | Condition of film |
|---|---|---|---|---|---|
| Potato starch | δ-Glucono-lactone 5 | 8 | 140 | 100 | Transparent, very flexible |
| Potato starch | δ-Glucono-lactone 15 | 8 | 140 | 100 | Transparent, very flexible |
| Potato starch | δ-Glucono-lactone 30 | 8 | 140 | 100 | Flexible, transparent (after about 2 days becoming cloudy) |
| Potato starch | Glucose 15 | 8 | 140 | 100 | Transparent, easily fractured, hard |

*The pH data relate to the conditions for preparing the thermoplastic molding compositions.

Example 13
Production of Films at 100° C. From Thermoplastic Molding Compositions with Gluconolactone or Glucose Prepared at Various pHs The molding compositions for the data of Table IV were prepared in a manner similar to that of Examples 5 and 6, except that the admixing of a second plasticizer was dispensed with. The films were produced in a manner similar to that of Example 4 at a temperature of 100° C.

TABLE IV

Assessment of films made from thermoplastic molding compositions by processing at 100° C.

| Starch | Plasticizer (%) | pH* | Temperature kneader (° C.) | Temperature press (° C.) | Condition of film |
|---|---|---|---|---|---|
| Potato starch | δ-Glucono-lactone 5 | 2 | 140 | 100 | Transparent, semiflexible |
| Potato starch | δ-Glucono-lactone 15 | 4 | 140 | 100 | Transparent, very flexible |
| Potato starch | Glucose 15 | 8 | 140 | 100 | Transparent, easily fractured, hard |

*The pH data relate to the conditions for preparing the thermoplastic molding compositions.

What is claimed is:

1. A composition comprising at least one polymer based on starch and/or on modified starch and a plasticizer, wherein said plasticizer comprises components
   a) polyhydroxycarboxylic acid derived from aldose and/or from ketose or
   b) a lactone of said acid of component a) except for ascorbic acid, in amounts of up to 1% by weight, based on the solids in the composition and the composition has a pH from 8 to 13.

2. The composition as claimed in claim 1, wherein the plasticizer is a polyhydroxycarboxylic acid derived from pentose and hexose, or a lactone of said polyhydroxycarboxylic acid derived from pentose and hexose.

3. The composition as claimed in claim 1, wherein the plasticizer is a sugar acid or lactone of said sugar acid.

4. The composition as claimed in claim 1, wherein the plasticizer is an aldonic acid or a lactone of said aldonic acid.

5. The composition as claimed in claim 4, wherein the plasticizer is gluconic acid or gluconolactone or a mixture thereof.

6. The composition as claimed in claim 1, wherein the plasticizer is an uronic acid or a lactone of said uronic acid.

7. The composition as claimed in claim 6, wherein the plasticizer is glucuronic acid or glucuronolactone or mixture thereof.

8. The composition as claimed in claim 1, which comprises from 2 to 30% by weight of said plasticizer.

9. The composition as claimed in claim 1, which comprises destructured starch.

10. The composition as claimed in claim 1, which comprises hydrolytically degraded starch.

11. The composition as claimed in claim 1, which comprises chemically modified starch.

12. The composition as claimed in claim 1, which comprises cationically or anionically modified starch.

13. The composition as claimed in claim 1, which further comprises proteins.

14. The composition as claimed in claim 1, whose pH has been set at from 8 to 10.

15. The composition as claimed in claim 1, which further comprises an additional plasticizer.

16. The composition as claimed in claim 15, which comprises a total of from 3 to 50% by weight of said plasticizer.

17. The composition as claimed in claim 1, which further comprises an additive selected from the group consisting of an extender, a lubricant, a mold-release agent, a dye and water and optionally further comprises a biopolymer.

18. The composition as claimed in claim 1, which comprises a total from 5 to 30% by weight of said plasticizer.

19. A shaped article which comprises the composition as claimed in claim 1.

20. The article as claimed in claim 19, wherein the article is for the controlled release of active substances.

21. A packaging for food or drink which comprises the composition as claimed in claim 1.

22. A sausage casing which comprises the composition as claimed in claim 1.

23. A packaging for pharmaceutical products which comprises the composition as claimed in claim 1.

24. A temporary protective coating for a technical device which comprises the compositionas claimed in claim 1.

25. A process for preparing a composition which comprises mixing and homogenizing starch and/or modified starch and plasticizers and optionally other polymers and additives, wherein said plasticizers are polyhydroxycarboxylic acids derived from aldoses and/or from ketoses, or using lactones of these acids and the composition has a pH from 8 to 13.

* * * * *

UNITED STATES PATENT AND TRADEMARK OFFICE
CERTIFICATE OF CORRECTION

PATENT NO. : 6,736,889 B2
DATED : May 18, 2004
INVENTOR(S) : Holger Bengs et al.

It is certified that error appears in the above-identified patent and that said Letters Patent is hereby corrected as shown below:

Title page,
Item [56], References Cited, OTHER PUBLICATIONS, "for c py" should read -- for copy --.

Column 14,
Line 53, "compositionsas" should read -- compositions as --.

Signed and Sealed this

Nineteenth Day of April, 2005

JON W. DUDAS
*Director of the United States Patent and Trademark Office*